United States Patent
Kim et al.

(10) Patent No.: US 9,636,658 B2
(45) Date of Patent: May 2, 2017

(54) METHOD OF MANUFACTURING LITHIUM SILICATE-BASED HIGH-TEMPERATURE DRY SORBENT FOR REMOVING CARBON DIOXIDE AND HIGH-TEMPERATURE DRY CARBON DIOXIDE SORBENT

(71) Applicant: Kyungpook National University Industry-Academic Cooperation Foundation, Daegu (KR)

(72) Inventors: Jae Chang Kim, Daegu (KR); Soo Chool Lee, Daegu (KR); Suk Yong Jung, Daegu (KR); Yong Mok Kwon, Gyeongsangbuk-do (KR); Min Joo Kim, Gyeongsangbuk-do (KR); Hwi Min Seo, Daejeon (KR); Yong Ki Park, Seoul (KR)

(73) Assignee: KYUNGPOOK NATIONAL UNIVERSITY INDUSTRY-ACADEMIC COOPERATION FOUNDATION, Daegu (KR)

(*) Notice: Subject to any disclaimer, the term of this patent is extended or adjusted under 35 U.S.C. 154(b) by 0 days.

(21) Appl. No.: 14/694,772

(22) Filed: Apr. 23, 2015

(65) Prior Publication Data
US 2015/0321166 A1    Nov. 12, 2015

(30) Foreign Application Priority Data

May 7, 2014  (KR) .................. 10-2014-0054418
Feb. 24, 2015 (KR) .................. 10-2015-0025956

(51) Int. Cl.
*C01B 33/32* (2006.01)
*B01J 20/08* (2006.01)
(Continued)

(52) U.S. Cl.
CPC ............... *B01J 20/08* (2013.01); *B01J 20/04* (2013.01); *B01J 20/041* (2013.01); *B01J 20/06* (2013.01);
(Continued)

(58) Field of Classification Search
CPC ............ B01D 53/1493; B01D 53/1425; B01D 53/1418; B01D 53/18; B01D 53/1475;
(Continued)

(56) References Cited

U.S. PATENT DOCUMENTS

| | | | |
|---|---|---|---|
| 6,764,565 B2 * | 7/2004 | Chen | C04B 35/19 156/89.11 |
| 2002/0042339 A1 * | 4/2002 | Beall | C04B 35/10 501/128 |
| 2003/0232722 A1 * | 12/2003 | Kato | B01D 53/02 502/411 |

FOREIGN PATENT DOCUMENTS

| | | |
|---|---|---|
| JP | 2003-62965 | 9/2004 |
| KR | 2013-0034993 | 4/2013 |

OTHER PUBLICATIONS

Soo Chool Lee et al. "Lithium Orthosilicate-based sorbent for CO2 capture at high temperature" Mar. 11, 2014 The Forth Korea CCS Conference. Abstract.*

(Continued)

*Primary Examiner* — Colleen Dunn
*Assistant Examiner* — Haytham Soliman
(74) *Attorney, Agent, or Firm* — Norton Rose Fulbright US LLP (57) ABSTRACT

Provided are a method of manufacturing a lithium silicate-based high-temperature dry sorbent for removing carbon dioxide and a high-temperature dry sorbent. The manufacturing method includes forming a mixed raw material by mixing a lithium precursor, silicon oxide and a metal oxide, (Continued)

obtaining a lithium silicate solid by drying the mixed raw material, and baking the obtained lithium silicate solid.

11 Claims, 7 Drawing Sheets

(51) Int. Cl.
- B01J 20/30 (2006.01)
- B01J 20/10 (2006.01)
- B01J 20/04 (2006.01)
- B01J 20/06 (2006.01)
- B01J 20/34 (2006.01)

(52) U.S. Cl.
CPC .............. *B01J 20/10* (2013.01); *B01J 20/30* (2013.01); *B01J 20/3078* (2013.01); *B01J 20/3433* (2013.01); *B01J 20/3483* (2013.01)

(58) Field of Classification Search
CPC .............. B01D 53/62; B01D 2252/504; B01D 2257/504; B01D 2251/306; B01D 2251/2062; B01D 2251/606; C01B 31/20; Y02C 10/06; Y02C 10/04; Y02C 10/08; Y02P 20/152
USPC ..... 156/89.11, 89.14, 89.16, 89.28; 264/603, 264/615, 662, 661, 681; 423/332
See application file for complete search history.

(56) References Cited

OTHER PUBLICATIONS

Monica Puccini et al., 'Lithium Silicate Pellets for CO2 Capture at High Temperature' Chemical Engineering Transactions, vol. 35, 2013, pp. 373-377.

* cited by examiner

METHOD OF MANUFACTURING LITHIUM SILICATE-BASED HIGH-TEMPERATURE DRY SORBENT FOR REMOVING CARBON DIOXIDE AND HIGH-TEMPERATURE DRY CARBON DIOXIDE SORBENT

CROSS-REFERENCE TO RELATED APPLICATION

This application claims priority to and the benefit of Korean Patent Applications No. 10-2014-0054418, filed May 7, 2014, and No. 10-2015-0025956, filed Feb. 24, 2015, the contents of which are incorporated herein by reference in their entirety.

BACKGROUND

1. Field of the Invention

The present invention relates to a method of manufacturing a lithium silicate-based high-temperature dry sorbent for removing carbon dioxide and a high-temperature dry carbon dioxide sorbent, and particularly, to a method of manufacturing a high-temperature dry carbon dioxide sorbent having excellent capture capacity and reproducibility to remove carbon dioxide released from a power plant or a steel mill and a high-temperature dry carbon dioxide sorbent.

2. Discussion of Related Art

Gases including a vapor, cloud, carbon dioxide, methane, nitrous oxide, ozone, and fluoride compounds (HFC, PFC, ClFC, and $SF_6$) are green house gases affecting climatic changes, and particularly, among these gases, carbon dioxide, methane, nitrous oxide, HFC, PFC and $SF_6$ correspond to six restricted gases. Usually, carbon dioxide is a gas exhausted to an air due to combustion of fossil fuel, and known as a gas having the largest influence on the climatic changes.

As a method for recovering/storing carbon dioxide, an absorption method, a film separation method using gas separation, or an adsorption method using a zeolite adsorbent is known. However, such a method has a high recovery cost due to high energy consumption and is difficult to treat a large amount of carbon dioxide. Recently, a study on a method of capturing carbon dioxide using a dry renewable sorbent is progressing.

Lithium silicate known as a dry carbon dioxide sorbent at a high temperature is degraded in carbon dioxide capture capacity in a long-term use because of grain growth occurring in regeneration of carbon dioxide. In Japanese Laid-Open Patent No. 2003-62965, to compensate such a disadvantage, an alkali metal carbonate and aluminum oxide or an aluminum compound are added after lithium silicate is prepared. However, this method has a complicated manufacturing process which is performed in two steps including preparing lithium silicate by baking (firing) lithium carbonate and silica at approximately 700° C., and additionally adding an alkali metal carbonate and aluminum oxide or an aluminum compound.

In addition, the lithium silicate exhibits a high carbon dioxide capture capacity (under 100 vol % of carbon dioxide) of 24 to 28 wt % at 500 to 550° C. While the lithium silicate has a high carbon dioxide capture capacity, it has a low capture rate and is degraded in capture capacity when continuously used.

SUMMARY OF THE INVENTION

The present invention is directed to providing a method of manufacturing a lithium silicate-based high-temperature dry sorbent for removing carbon dioxide, the sorbent being regenerated at a lower temperature, having excellent carbon dioxide recovery and regeneration properties, and having a higher rate of capturing carbon dioxide than a conventional sorbent through a simple process.

The present invention is also directed to providing a high-temperature dry carbon dioxide sorbent.

In one aspect, the present invention provides a method of manufacturing a lithium silicate-based high-temperature dry sorbent for removing carbon dioxide. The manufacturing method includes forming a mixed raw material by mixing a lithium precursor, silicon oxide and a metal oxide, obtaining lithium silicate by drying the mixed raw material and forming a high temperature dry sorbent by baking the obtained lithium silicate.

In one exemplary embodiment, the metal oxide may include aluminum oxide or zirconium oxide.

In one exemplary embodiment, the metal oxide may be γ-aluminum oxide.

In one exemplary embodiment, the metal oxide may be included at 1 to 30 wt % with respect to a total weight of the mixed raw material.

In one exemplary embodiment, the mixed raw material may further include an alkali metal carbonate.

In one exemplary embodiment, the alkali metal carbonate may be included at 1 to 10 wt % with respect to the total weight of the mixed raw material. The alkali metal carbonate may be preferably included at 1 to 5 wt % with respect to the total weight of the mixed raw material.

In one exemplary embodiment, the lithium precursor may include lithium carbonate, lithium hydroxide, lithium oxalate, lithium acetate or lithium nitrate.

In one exemplary embodiment, the lithium precursor may be lithium carbonate.

In one exemplary embodiment, the high-temperature dry sorbent may include lithium silicate ($Li_4SiO_4$) and lithium metasilicate ($Li_2SiO_3$).

In another aspect, the method of manufacturing a lithium silicate-based high-temperature dry sorbent for removing carbon dioxide according to an exemplary embodiment of the present invention includes obtaining lithium silicate ($Li_4SiO_4$) by reacting a lithium precursor and silicon oxide, and mixing lithium metasilicate ($Li_2SiO_3$) in the lithium silicate.

In one exemplary embodiment, in the mixing of lithium metasilicate, an additive may be further mixed.

In still another aspect, the lithium silicate-based high-temperature dry sorbent for removing carbon dioxide according to an exemplary embodiment of the present invention includes lithium silicate ($Li_4SiO_4$) and lithium metasilicate ($Li_2SiO_3$).

In one exemplary embodiment, the high-temperature dry sorbent may further include lithium aluminate and/or lithium zirconate.

In one exemplary embodiment, the high-temperature dry sorbent may further include lithium-carbonate represented as $LiMCO_3$ (wherein M is potassium (K) or sodium (Na)).

In one exemplary embodiment, the high-temperature dry sorbent may include 3.6 to 5 mol of lithium (Li) with respect to 1 mol of silicon (Si) and 5 to 15 wt % of aluminum (Al) or zirconium (Zr) with respect to a total weight.

BRIEF DESCRIPTION OF THE DRAWINGS

The above and other objects, features, and advantages of the present invention will become more apparent to those of ordinary skill in the art by describing exemplary embodiments thereof in detail with reference to the accompanying drawings, in which.

DETAILED DESCRIPTION OF EXEMPLARY EMBODIMENTS

Hereinafter, exemplary embodiments of the present invention will be described in detail with respect to the accompanying drawings. Since the present invention may be modified in various types and have various forms, specific exemplary embodiments are illustrated in the drawings and fully explained in the specification. However, it should be understood that the present invention is not limited to the specific type disclosed but includes all of the modifications, equivalents or alternatives included in the spirit and scope of the present invention. To explain the drawings, like reference numerals denote like components.

The terms used in the present invention are merely used to explain specific embodiments, and are not intended to limit the present invention. Singular expressions, unless clearly defined otherwise in the context, include plural expressions. It should be understood that the term "comprise or include" or "have" used herein indicates that a characteristic, a number, a step, an operation, a component, a part or a combination thereof described in the specification is present, but does not preclude the possibility of the presence or addition of at least one different characteristic, number, step, operation, component, part or combination thereof.

Meanwhile, unless defined otherwise, all of the terms used herein, including technical or scientific terms, have the same meaning as generally understood by those of ordinary skill in the art including the present invention. The terms defined in a generally used dictionary should be interpreted to match the contextual meaning of the related art, and unless clearly defined in the present invention, should not be interpreted as idealistic or excessively formal meanings.

Figure 1:
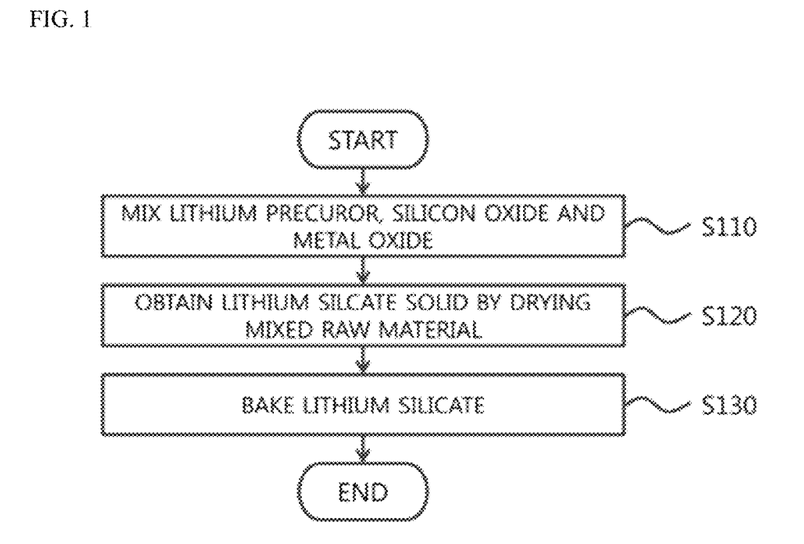
FIG. 1 is a flowchart illustrating a process of manufacturing a high-temperature dry sorbent according to an exemplary embodiment of the present invention.

FIG. 1 is a flowchart illustrating a process of manufacturing a high-temperature dry sorbent according to an exemplary embodiment of the present invention.

Referring to FIG. 1. first, a mixed raw material is prepared by mixing a lithium precursor, silicon oxide and a metal oxide (S110).

The mixed raw material may be prepared by uniformly mixing the materials using a pestle and a mortar for 30 minutes to 1 hour.

As an example of the lithium precursor, lithium carbonate ($Li_2CO_3$), lithium hydroxide (LiOH, $LiOH \cdot H_2O$), lithium oxalate, lithium acetate or lithium nitrate ($LiNO_3$) may be used. These materials may be used alone or in combination with at least two thereof.

The silicon oxide generates lithium silicate ($Li_4SiO_4$) by a reaction with the lithium precursor in a suitable molar ratio. As the molar ratio of the silicon oxide to the lithium precursor is controlled, lithium metasilicate ($Li_2SiO_3$) may be generated as well as the lithium silicate ($Li_4SiO_4$).

Since the lithium silicate ($Li_4SiO_4$) and a lithium-oxometallic acid salt may be generated by a reaction of the silicon oxide and the metal oxide, the lithium precursor of the present invention may be at least one selected from lithium carbonate ($Li_2CO_3$), lithium hydroxide (LiOH, $LiOH \cdot H_2O$) and lithium nitrate ($LiNO_3$). In consideration of a price and handleability, as a lithium precursor to be used in mass production, lithium carbonate is preferably used.

The metal oxide reacts with the lithium precursor, thereby generating a lithium-oxometallic acid salt. When the lithium-oxometallic acid salt is generated, the molar ratio of the lithium precursor capable of reacting with the silicon oxide is changed, and thus lithium metasilicate ($Li_2SiO_3$) may be maintained after regeneration. The lithium-oxometallic acid salt and the lithium metasilicate ($Li_2SiO_3$) are inactive materials, and may serve to prevent agglomeration of the lithium silicate ($Li_4SiO_4$). That is, although a large amount of the lithium silicate ($Li_4SiO_4$), which is an active material generated by a reaction of the lithium precursor and the silicon oxide, is generated, due to grain growth or agglomeration, it is difficult to maintain a capture capacity in a long-term drive, but the lithium-oxometallic acid salt generated using the metal oxide like the present invention reduces the agglomeration of the lithium silicate ($Li_4SiO_4$) occurring in high temperature regeneration, and may be regenerated at a lower temperature than a conventional sorbent.

As an example of the metal oxide, aluminum oxide including α-aluminum oxide, γ-aluminum oxide and δ-aluminum oxide, or zirconium oxide may be used. Such a material may be used alone or in combination with at least two thereof.

When the aluminum oxide is used as the metal oxide, lithium aluminate may be generated as the lithium-oxometallic acid salt. Alternatively, when the zirconium oxide is used as the metal oxide, lithium zirconate may be generated as the lithium-oxometallic acid salt.

Since the α-aluminum oxide has a stable structure, it does not react with the lithium carbonate, and makes it difficult to generate the lithium aluminate, and the δ-aluminum oxide generates a larger amount of the lithium aluminate than the α-aluminum oxide, but generates a smaller amount than the γ-aluminum oxide. The γ-aluminum oxide reacts with the lithium carbonate one by one as much as the amount of the added γ-aluminum oxide, thereby generating lithium aluminate, and a reaction molar ratio of the silicon oxide to the lithium carbonate is reduced. Accordingly, to generate a component serving to prevent the agglomeration of the lithium silicate ($Li_4SiO_4$) in coexistence of the lithium silicate ($Li_4SiO_4$) and the lithium metasilicate ($Li_2SiO_3$), as the aluminum oxide of the present invention, the γ-aluminum oxide is preferably used.

To generate the lithium silicate ($Li_4SiO_4$), a molar ratio of the lithium precursor and the silicon oxide may be 1:1 to 5:1. When a content of the silicon oxide is larger than that of the lithium precursor, an amount of the lithium silicate ($Li_4SiO_4$) is reduced and an amount of the lithium metasilicate ($Li_2SiO_3$) as an inactive material is increased, the capture capacity is maintained in a repeated experiment, but a performance of the sorbent is degraded. Contrarily, when the molar ratio of the lithium precursor and the silicon oxide is more than 5:1, non-reacted lithium carbonate remains, an amount of the lithium silicate ($Li_4SiO_4$) is relatively decreased, and thus the performance of the sorbent may be degraded. Accordingly, to generate the lithium silicate ($Li_4SiO_4$), a molar ratio of the lithium precursor and the silicon oxide may be 1:1 to 5:1, preferably 1.5:1 to 3.5:1, more preferably, 1.5:1 to 3:1, and further more preferably, 1.8:1 to 2.5:1. When the molar ratio of the lithium carbonate and the silicon oxide is lower than 2:1, a structure of the lithium metasilicate tends to be relatively increased, and thus the molar ratio is most preferably 2:1.

For example, as the molar ratio of the lithium carbonate and the silicon oxide is 2:1 and a metal oxide is added, the lithium carbonate and the metal oxide are reacted in a molar ratio of 1:1, thereby forming the lithium-oxometallic acid salt, and the lithium carbonate capable of reacting with the silicon oxide is reduced to 1.7 to 1.85 mol. Therefore, in the preparation of the lithium silicate ($Li_4SiO_4$), the lithium-oxometallic acid salt and the lithium metasilicate ($Li_2SiO_3$) may be generated together.

A content of the metal oxide may be 1 to 30 wt % with respect to the total weight of the mixed raw material. When the content of the metal oxide is less than 1 wt %, even though a production amount of the lithium silicate ($Li_4SiO_4$) is increased, due to a decreased production amount of the lithium-oxometallic acid salt, agglomeration occurs, and when the content of the metal oxide is more than 30 wt %, the content of the active material, lithium silicate ($Li_4SiO_4$), is decreased, and thus a carbon dioxide absorption performance may be degraded. The content of the metal oxide may be 3 to 20 wt %, and preferably 5 to 15 wt % with respect to the total weight of the mixed raw material. For example, the content of the metal oxide may be 10 wt % with respect to the total weight of the mixed raw material.

In one exemplary embodiment, when the mixed raw material is prepared, an alkali metal carbonate may be added. That is, to prepare the mixed raw material, a lithium precursor, silicon oxide, a metal oxide and an alkali metal carbonate may be used.

The alkali metal carbonate may serve as a promoter to reduce a reaction molar ratio of the silicon oxide and the lithium precursor such that lithium silicate ($Li_4SiO_4$) and lithium metasilicate ($Li_2SiO_3$) coexist with each other. The content of the alkali metal carbonate may be 1 to 10 wt % with respect to the total weight of the mixed raw material. When the content of the alkali metal carbonate is more than 10 wt %, due to an eutectic reaction, a water absorption property is degraded. The content of the alkali metal carbonate is preferably 5 wt % or less.

The alkali metal carbonate may be potassium carbonate ($K_2CO_3$) or sodium carbonate ($Na_2CO_3$), and may be used alone or in combination with at least two thereof.

Subsequently, the mixed raw material prepared in S110 is dried, thereby obtaining a lithium silicate solid (S120).

For example, the mixed raw material may be contained in an aluminum crucible and dried in an atmospheric ambience using a heating furnace at a temperature of 100 to 200° C. for 1 to 10 hours, thereby obtaining a lithium silicate solid. The solid may be obtained in various forms such as powder, a mold, or a film coated on a substrate.

The lithium silicate solid is baked so as to manufacture a high-temperature dry sorbent according to the present invention (S130).

The baking process is performed through thermal treatment in an atmospheric ambience at a high temperature of 500° C. or more. The temperature for the baking process may be 700° C.

As described above, a synthesis reaction may be performed on the physically and simply mixed raw material in the baking step, thereby simply and stably manufacturing a final product, a high-temperature dry sorbent according to the present invention.

Here, the manufactured high-temperature dry sorbent includes lithium silicate ($Li_4SiO_4$), lithium metasilicate ($Li_2SiO_3$) and a lithium-oxometallic acid salt. That is, the high-temperature dry sorbent includes the lithium silicate ($Li_4SiO_4$) as a substantial active material of the sorbent, and the lithium metasilicate ($Li_2SiO_3$) and the lithium-oxometallic acid salt preventing agglomeration of the active material and facilitating regeneration. Accordingly, the dry sorbent has an excellent carbon dioxide regeneration property even though driven at a high temperature for a long time, has a high capture capacity and enables regeneration at a low temperature.

For example, the high-temperature dry sorbent may include 3.6 to 5 mol of lithium (Li) with respect to 1 mol of silicon (Si), and 5 to 15 wt % of a metal included in the metal oxide, that is, aluminum (Al) or zirconium (Zr) with respect to a total weight of the high-temperature dry sorbent. For example, the high-temperature dry sorbent may include 4 mol of lithium with respect to 1 mol of silicon (Si), and 10 wt % of aluminum with respect to the total weight.

While, in FIG. 1, the case in which the mixed raw material includes a metal oxide was explained, a high-temperature dry sorbent may be manufactured by preparing lithium silicate ($Li_4SiO_4$) by primarily reacting a lithium precursor with silicon oxide, and additionally mixing lithium metasilicate ($Li_2SiO_3$). Here, the high-temperature dry sorbent includes lithium silicate ($Li_4SiO_4$) and lithium metasilicate ($Li_2SiO_3$). Additionally, an additive for improving a carbon dioxide capture capacity may be further added to the lithium silicate ($Li_4SiO_4$) and the lithium metasilicate ($Li_2SiO_3$).

Hereinafter, through specific examples and comparative examples and characteristic evaluation, the present invention will be described in further detail. However, the following examples are merely provided to explain the present invention in detail, but the scope of the present invention is not limited thereto.

Preparation of Samples 1-1 to 1-3 (Change in Content of Aluminum Oxide)

Lithium carbonate and silicon oxide were prepared in a molar ratio of 2:1, 10 wt % of γ-aluminum oxide was added based on a total weight of a sorbent, and the mixture was mixed using a mortar for 30 minutes. The mixed sample was contained in an aluminum oxide crucible, dried in an atmospheric ambience using a heating furnace at 150° C. for 4 hours, and then heated again to 700° C. to bake for 5 hours, thereby preparing Sample 1-1 (LS2Al(G)10) according to Example 1-1 of the present invention.

In addition, Sample 1-2 (LS2Al(G)20) according to Example 1-2 and Sample 1-3 (LS2Al(G)30) according to Example 1-3 were prepared by substantially the same process as used to prepare Sample 1-1, except that γ-aluminum oxide was added at 20 wt % and 30 wt % to respective samples based on the total weight of the sorbent.

Preparation of Comparative Sample 1

Comparative Sample 1 (LS2) according to Comparative Example 1 was prepared through mixing, drying and baking using lithium carbonate and silicon oxide in a molar ratio of 2:1.

Evaluation of Samples 1-1 to 1-3 and Comparative Sample 1: Carbon Dioxide Capture Capacity For each of Samples 1-1 to 1-3 and Comparative Sample 1, 1 g of a sorbent was put into a ¾-inch fixed bed reactor, and a mixed gas containing 10 vol % carbon dioxide, 10 vol % $H_2O$ and 80 vol % $N_2$ passed through the reactor to measure a carbon dioxide capture capacity. A capture reaction of the sorbent was performed at 550° C., and regeneration was performed in a nitrogen atmosphere while maintaining a temperature at 700° C. The capture capacity is represented as an amount (mg) of captured carbon dioxide per g of the sorbent, and the results are shown in Table 1 and FIG. 2A.

TABLE 1

| Sortation | 1st cycle (mg $CO_2$/g sorbent) | 2nd cycle (mg $CO_2$/g sorbent) | 3rd cycle (mg $CO_2$/g sorbent) |
| --- | --- | --- | --- |
| Sample 1-1 (LS2AG10) | 202.2 | 210.6 | 208.1 |
| Sample 1-2 (LS2AG20) | 110.9 | 127.5 | 126.1 |
| Sample 1-3 (LS2AG30) | 48.9 | 44.3 | 49.3 |
| Comparative Sample 1 (LS2) | 227.1 | 166.6 | 103.5 |

Figure 2A:
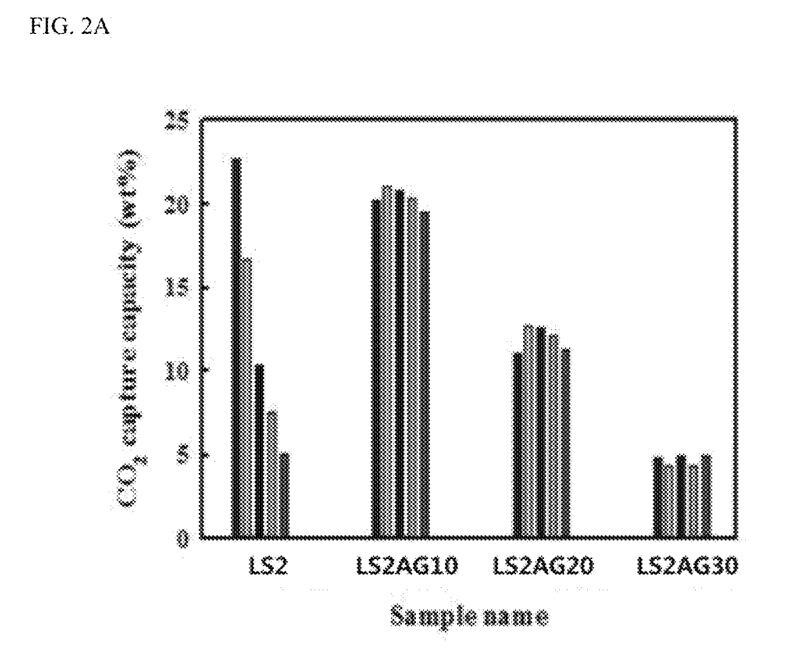
FIG. 2A is a graph showing carbon dioxide capture capacities of Samples 1-1 to 1-3 and Comparative Sample 1 according to an exemplary embodiment of the present invention.

Referring to FIG. 2A and Table 1, it can be seen that, in Comparative Sample 1, as the experiment is repeated, that is, the number of cycles is increased, the capture capacity is degraded, but in Samples 1-1 to 1-3, there is a very small change in capture capacity. In FIG. 2A, the left bar in each sample represents the result of the first cycle, and the number of cycles is increased to the right. Particularly, while in Comparative Sample 1 at the third cycle, the capture capacity is considerably degraded to ½ or more, in Samples 1-1 to 1-3 according to the present invention, there is almost no change in capture capacity. Since Sample 1-1 (LS2AG10) has a high and almost uniform capture capacity even by repeated experiments, it can be determined that it is a sorbent containing the most suitable amount of γ-aluminum oxide.

XRD Analysis for Samples 1-1 to 1-3 and Comparative Sample 1

Figure 2B:
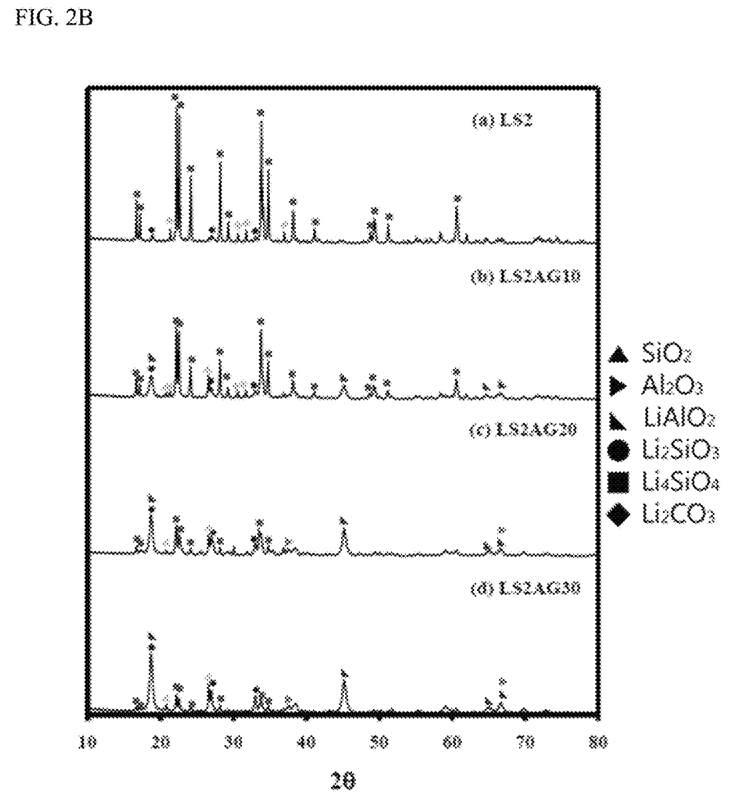
FIG. 2B is a diagram showing XRD analysis results for Samples 1-1 to 1-3 and Comparative Sample 1 before carbon dioxide is captured according to an exemplary embodiment of the present invention.

XRD analysis was performed on Samples 1-1 to 1-3 and Comparative Sample 1 before carbon dioxide was captured, and the results are shown in FIG. 2B.

In FIG. 2B, (a) is a graph of Comparative Sample 1 (LS2), and (b), (c) and (d) are graphs of Sample 1-1 (LS2AG10), Sample 1-2 (LS2AG20) and Sample 1-3 (LS2AG30).

Referring to FIG. 2B, unlike (a), it can be seen that lithium aluminate ($LiAlO_2$) is generated from all of (b), (c) and (d). A molar ratio of lithium carbonate capable of reacting with silicon oxide is changed by generating lithium aluminate ($LiAlO_2$) by a reaction of lithium carbonate and γ-aluminum oxide, and thus lithium metasilicate ($Li_2SiO_3$) is maintained after regeneration. Therefore, it can be confirmed that agglomeration occurring in high temperature regeneration is reduced, and thus regeneration can occur at a lower temperature than the conventional sorbent.

Evaluation of Samples 1-1 to 1-3 and Comparative Sample 1: Regeneration Property For each of Samples 1-1 to 1-3 and Comparative Sample 1, temperature programmed desorption (TPD) analysis was performed by capturing carbon dioxide at 550° C. in the presence of water and raising a temperature by 1° C. per minute from 550 to 800° C. The results are shown in FIG. 2C.

Figure 2C:
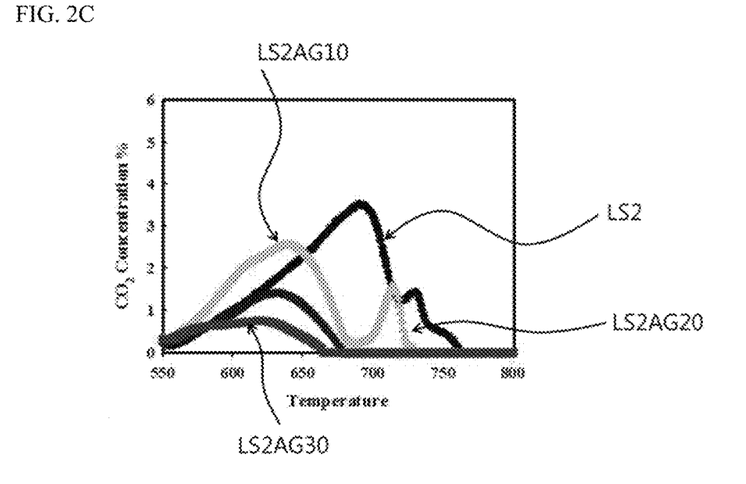
FIG. 2C is a diagram showing a result of evaluating regeneration properties of Samples 1-1 to 1-3 and Comparative Sample 1 according to an exemplary embodiment of the present invention.

Referring to FIG. 2C, it can be seen that, in each of Sample 1-1 (LS2AG10), Sample 1-2 (LS2AG20) and Sample 1-3 (LS2AG30), most of carbon dioxide is emitted at a temperature of approximately 640 to 650° C. On the other hand, it can be seen that, in Comparative Sample 1 (LS2), carbon dioxide is emitted at a temperature of approximately 690 to 700° C. That is, it can be seen that, when the high-temperature dry sorbent of the present invention is used, regeneration can occur at a lower temperature than Comparative Sample 1.

Preparation of Samples 1-4 to 1-6 (Change in Molar Ratio of Lithium Carbonate and Silicon Oxide)

Lithium carbonate and silicon oxide were prepared in a molar ratio of 1.5:1 and baked at 700° C., thereby preparing lithium silicate, and 10 wt % of lithium aluminate prepared by a reaction of lithium carbonate and γ-aluminum oxide was added based on a total weight of a sorbent and mixed with the lithium silicate using a mortar for 30 minutes. The mixed sample was contained in an aluminum oxide crucible and dried in an atmospheric ambience using a heating furnace at 150° C. for 4 hours, and then heated again to 700° C. to bake for 5 hours, thereby preparing Sample 1-4 (LS1.5Al(G)10).

In addition, Sample 1-5 (LS1.5Al(G)20) and Sample 1-6 (LS1.5Al(G)30) were prepared by substantially the same process as used to prepare Sample 1-4, except that 20 and 30 wt % of lithium aluminate were added to the respective samples.

Evaluation of Samples 1-4 to 1-6: Carbon Dioxide Capture Capacity

Evaluation of a carbon dioxide capture capacity was performed on Samples 1-4 to 1-6 by substantially the same method as the experiment for evaluating a carbon dioxide capture capacity of Samples 1-1 to 1-3. The results are shown in Table 2.

TABLE 2

| Sortation | 1st cycle (mg $CO_2$/g sorbent) | 2nd cycle (mg $CO_2$/g sorbent) | 3rd cycle (mg $CO_2$/g sorbent) |
| --- | --- | --- | --- |
| Sample 1-4 (LS1.5A1(G)10) | 190.5 | 188.3 | 189.7 |
| Sample 1-5 (LS1.5A1(G)20) | 169.9 | 170.1 | 168.4 |
| Sample 1-6 (LS1.5A1(G)30) | 157.7 | 156.3 | 157.1 |
| Comparative Sample 1 (LS2) | 227.1 | 166.6 | 103.5 |

Referring to Table 2, it can be seen that, from Samples 1-4, 1-5 to 1-6, the carbon dioxide capture capacity tends to be degraded.

However, as a result of the regeneration experiment, it can be seen that, in all of Samples 1-4 to 1-6, the capture capacity is maintained due to the lithium aluminate, and therefore, it was determined that the lithium aluminate has a large influence on the regeneration property.

Preparation of Samples 1-7 and 1-8 (Change in Type of Aluminum Oxide)

Sample 1-7 (LS2Al(D)10) was prepared by substantially the same process as used to prepare Sample 1-1, except that δ-aluminum oxide was used.

In addition, Sample 1-8 (LS2Al(A)10) was prepared by substantially the same process as used to prepare Sample 1-1, except that α-aluminum oxide was used.

Evaluation of Samples 1-7 and 1-8: Carbon Dioxide Capture Capacity

Evaluation of a carbon dioxide capture capacity was performed on Samples 1-7 and 1-8 by substantially the same method as used in the experiment for evaluating a carbon dioxide capture capacity of Samples 1-1 to 1-3. The results are shown in Table 3.

TABLE 3

| Sortation | 1st cycle (mg $CO_2$/g sorbent) | 2nd cycle (mg $CO_2$/g sorbent) | 3rd cycle (mg $CO_2$/g sorbent) |
| --- | --- | --- | --- |
| Sample 1-7 (LS2A1(D)10) | 211.4 | 163.3 | 150.8 |
| Sample 1-8 (LS2A1(A)20) | 223.0 | 141.7 | 126.0 |
| Sample 1-1 (LS2AG10) | 202.2 | 210.6 | 208.1 |

Referring to Table 3, when aluminum oxide is selected as a metal oxide, regardless of its type, it can be seen that the capture capacity at the first cycle has a similar value.

However, it can be seen that, in Sample 1-7 (LS2Al(D)10) using the δ-aluminum oxide, which has a more stable structure than the γ-aluminum oxide, as a repeated experiment progresses, the capture capacity is reduced, and in Sample 1-8 (LS2Al(A)10) using the α-aluminum oxide, which has a more stable structure than the δ-aluminum oxide, as a repeated experiment progresses, the capture capacity is more degraded. It is confirmed that, as the structure of the aluminum oxide is stabilized, lithium aluminate is less generated, and thus the regeneration property is degraded.

Evaluation of Samples 2-1 and 2-3 (Change in Content of Zirconium Oxide)

Lithium carbonate and silicon oxide were prepared in a molar ratio of 2:1, 10 wt % of zirconium oxide was added based on a total weight of a sorbent, and the mixture was mixed using a mortar for 30 minutes. The mixed sample was contained in an aluminum oxide crucible, dried in an atmospheric ambience using a heating furnace at 150° C. for 4 hours, and then heated again to 700° C. to bake for 5 hours, thereby preparing Sample 2-1 (LS2Z10P) according to Example 2-1.

In addition, Sample 2-2 (LS2Z20P) according to Example 2-2 and Sample 2-3 (LS2Z30P) according to Example 2-3 were prepared by substantially the same process as used to prepare Sample 2-1, except that 20 and 30 wt % of zirconium oxide were added to the respective samples based on the total weight of the sorbent.

Evaluation of Samples 2-1 to 2-3 and Comparative Sample 1: Carbon Dioxide Capture Capacity For each of Samples 2-1 to 2-3 and Comparative Sample 1, carbon dioxide capture capacity was measured by substantially the same method as used in the experiment for evaluating a carbon dioxide capture capacity of Sample 1-1. The results are shown in Table 4 and FIG. 3A.

TABLE 4

| Sortation | 1st cycle (mg $CO_2$/g sorbent) | 2nd cycle (mg $CO_2$/g sorbent) | 3rd cycle (mg $CO_2$/g sorbent) |
| --- | --- | --- | --- |
| Sample 2-1 (LS2Z10P) | 202.2 | 210.6 | 208.1 |
| Sample 2-2 (LS2Z20P) | 110.9 | 127.5 | 126.1 |
| Sample 2-3 (LS2Z30P) | 48.9 | 44.3 | 49.3 |
| Comparative Sample 1 (LS2) | 227.1 | 166.6 | 103.5 |

Figure 3A:
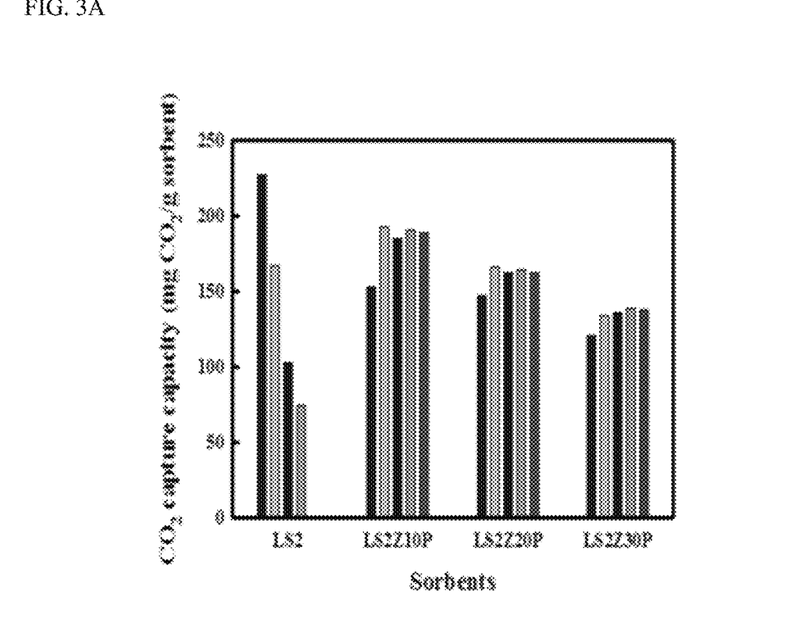
FIG. 3A is a graph showing carbon dioxide capture capacities of Samples 2-1 to 2-3 and Comparative Sample 2 according to an exemplary embodiment of the present invention.

Referring to FIG. 3A and Table 4, it can be seen that, in Samples 2-1 to 2-3, the capture capacity has less changed, but in Comparative Sample 1 (LS2), which is a sorbent manufactured only of lithium carbonate and silica, the carbon dioxide capture capacity is high in the early stage but considerably degraded as the experiment progresses.

XRD Analysis for Sample 2-1

Figure 3B:
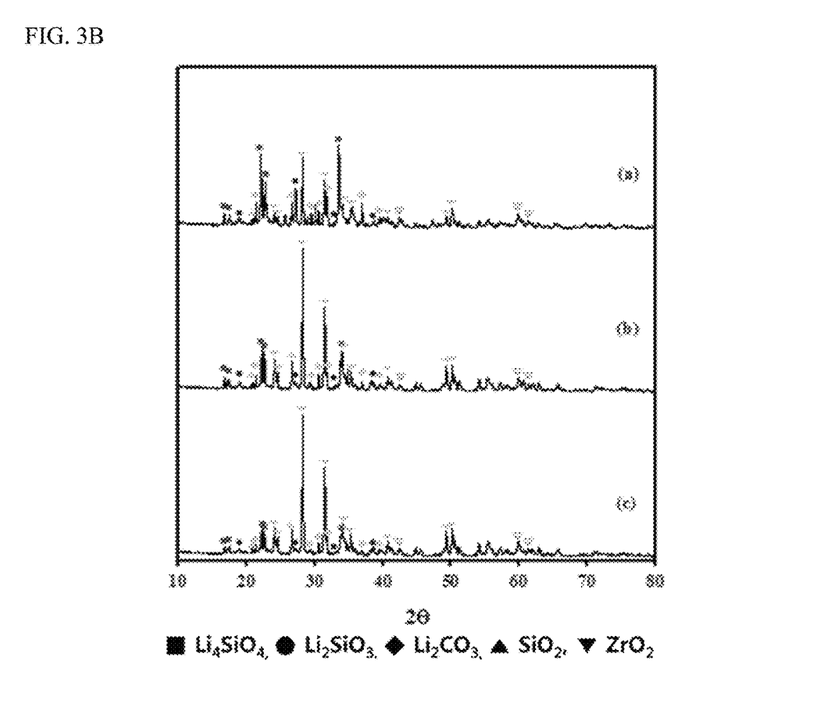
FIG. 3B is a diagram showing an XRD analysis result for Sample 2-1 before and after carbon dioxide is captured and after carbon dioxide is regenerated according to an exemplary embodiment of the present invention.

XRD analysis was performed on Sample 2-1 before and after carbon dioxide was captured and after carbon dioxide was regenerated, and the results are shown in FIG. 3B.

In FIG. 3B, (a) is a XRD analysis graph before capture, (b) is an XRD analysis graph after capture, and (c) is an XRD analysis graph after regeneration. In addition, in FIG. 3B, ■ denotes $Li_4SiO_4$, ● denotes $Li_2SiO_3$, ◆ denotes $Li_2CO_3$, ▲ denotes $SiO_2$, and ▼ denotes $ZrO_2$.

Referring to FIG. 3B, it can be seen that, in Sample 2-1, before capture and after regeneration of carbon dioxide, the sample returned to an original structure and exhibited a complete regeneration property. Particularly, as Sample 2-1 is manufactured using zirconium oxide, lithium zirconate ($Li_2ZrO_3$) is formed by a reaction of lithium carbonate and the zirconium oxide, and thus the molar ratio of lithium carbonate and silicon oxide is changed, thereby forming lithium metasilicate ($Li_2SiO_3$). Although the lithium metasilicate ($Li_2SiO_3$) and lithium zirconate ($Li_2ZrO_3$) are inactive materials, they are present between active materials, that is, lithium silicate ($Li_4SiO_4$), and therefore agglomeration occurring in the capture of carbon dioxide is prevented.

Evaluation of Sample 2-1: Regeneration Property

Temperature programmed desorption (TPD) analysis was performed on Sample 2-1 by capturing carbon dioxide at 550° C. in the presence of water and raising a temperature by 1° C. per minute from 550 to 800° C. The results are shown in FIG. 3C.

Figure 3C:
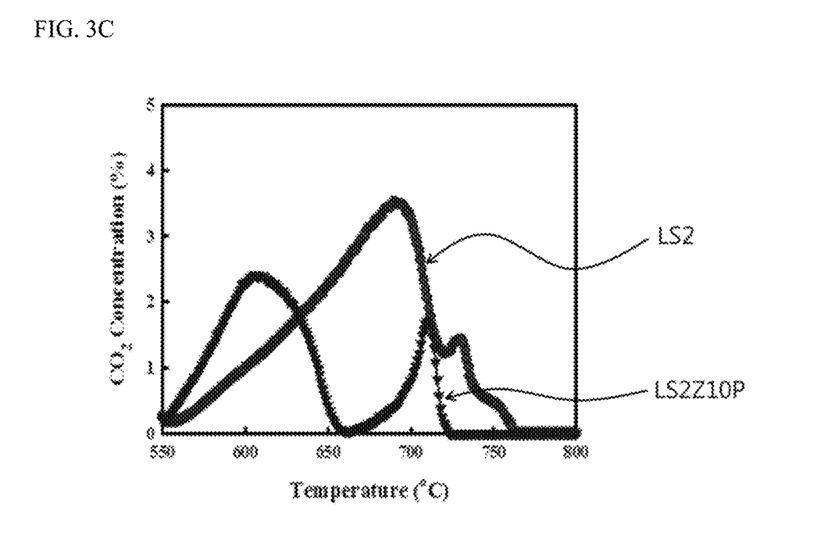
FIG. 3C is a diagram showing a result of evaluating a regeneration property of Sample 2-1 according to an exemplary embodiment of the present invention.

Referring to FIG. 3C, it can be seen that, in Sample 2-1 (LS2Z10P), most of carbon dioxide is emitted at a temperature of approximately 610 to 630° C. Contrarily, it can be seen that, in Comparative Sample 1 (LS2), carbon dioxide is emitted at a temperature of approximately 690 to 700° C. That is, it can be determined that, when the high-temperature dry sorbent of the present invention is used, carbon dioxide can be regenerated at a lower temperature than Comparative Sample 1.

Confirmation of Structure of Sample 2-1

Figure 3D:
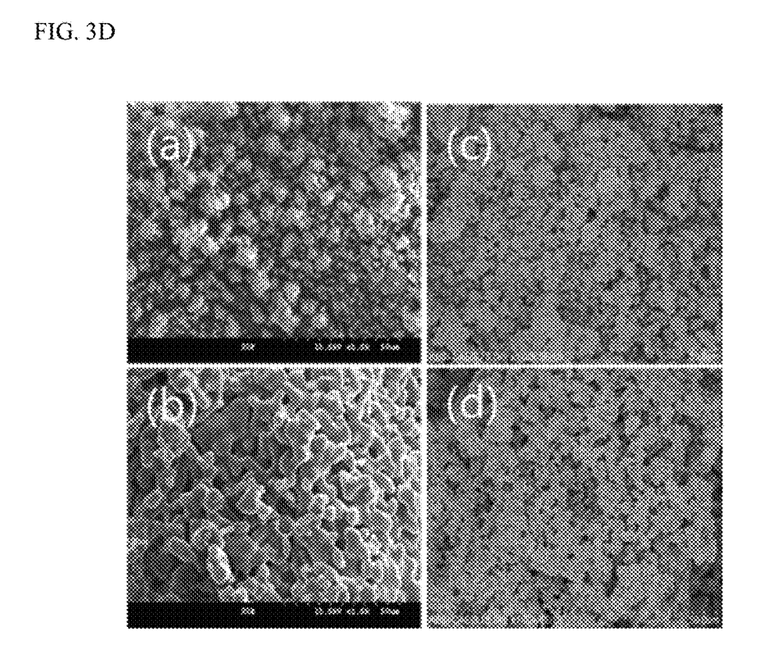
FIG. 3D shows scanned electron microscope (SEM) images of Sample 2-1 and Comparative Sample 1 according to an exemplary embodiment of the present invention.

Scanned electron microscope (SEM) images for Comparative Sample 1 and Sample 2-1 were taken. In addition, SEM images of the states after the 7th cycle were taken. The results are shown in FIG. 3D. In FIG. 3D, (a) is an image of Comparative Sample 1, (b) is an image of Comparative Sample 1 after the 7th cycle, (c) is an image of Sample 2-1, and (d) is an image of Sample 2-1 after the 7th cycle.

Referring to 3D, it can be seen that, in Comparative Sample 1, grain growth occurs due to agglomeration after a continuous experiment. Contrarily, in Sample 2-1, it can be seen that a uniform particle size is observed without agglomeration even after the continuous experiment, as substantially similar to that before the experiment.

Preparation of Comparative Samples 2 and 3

Comparative Sample 2 was prepared by substantially the same method as used to prepare Sample 1-1, except that cerium oxide was used instead of aluminum oxide.

In addition, Comparative Sample 3 was prepared by substantially the same method as used to prepare Sample 1-1, except that magnesium oxide was used instead of aluminum oxide.

Evaluation of Samples 1-1 and 2-1. And Comparative Samples 2 and 3: Carbon Dioxide Capture Capacity For each of Sample 2-1 and Comparative Samples 2 and 3, a carbon dioxide capture capacity was measured by substantially the same method as used in the experiment for evaluating a carbon dioxide capture capacity of Sample 1-1. The results are shown in Table 5.

TABLE 5

| Sortation | 1st cycle (mg $CO_2$/g sorbent) | 2nd cycle (mg $CO_2$/g sorbent) | 3rd cycle (mg $CO_2$/g sorbent) |
|---|---|---|---|
| Sample 1-1 (LS2AG10) | 202.2 | 210.6 | 208.1 |
| Sample 2-1 (LS2Z10P) | 138.4 | 175.5 | 171.3 |
| Comparative sample 2 (LS2Ce10P) | 90.9 | 59.7 | 58.7 |
| Comparative Sample 3 (LS2Mg10P) | 132.2 | 159.9 | 97.6 |

Referring to Table 5, it can be seen that, in Samples 1-1 and 2-1, even though a continuous experiment is performed, the carbon dioxide capture capacity is not degraded. Contrarily, in Comparative Samples 2 and 3 using cerium or magnesium, it can be seen that the carbon dioxide capture capacity is considerably degraded through the continuous experiment.

Preparation of Samples 3-1 and 3-2 (Addition of Carbonate)

Sample 3-1 (LS2AG5K5) was prepared by substantially the same method as used to prepare Sample 1-1, except that 5 wt % of potassium carbonate with respect to a total weight of a mixed raw material was further included.

In addition, Sample 3-2 (LS2Z5K5) was prepared by substantially the same method as used to prepare Sample 2-1, except that 5 wt % of potassium carbonate with respect to the total weight of the mixed raw material was further included.

Evaluation of Samples 3-1 and 3-2: Carbon Dioxide Capture Capacity

For Samples 3-1 and 3-2, a carbon dioxide capture capacity was evaluated by substantially the same method as used in the experiment for evaluating a carbon dioxide capture capacity of Sample 1-1. The results are shown in FIG. 4A.

In addition, change in carbon dioxide capture capacity according to time was measured. The result is shown in FIG. 4B.

Figure 4A:
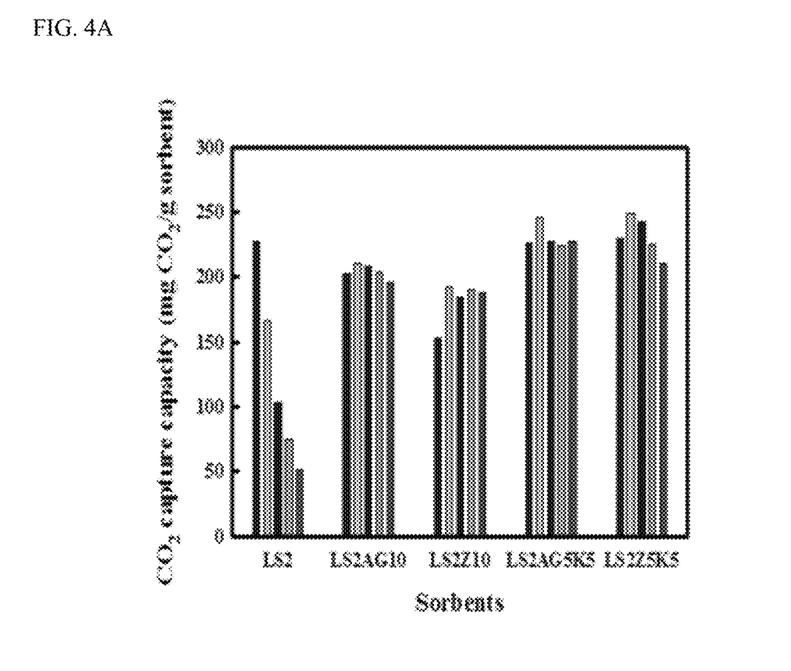
FIG. 4A is a graph showing carbon dioxide capture capacities of Samples 3-1 and 3-2 according to an exemplary embodiment of the present invention.

Referring to FIG. 4A, it can be seen that, in Sample 3-1 (LS2AG5K5) and Sample 3-2 (LS2Z5K5), there is substantially no degradation in carbon dioxide capture capacity even by a continuous experiment, compared to Comparative Sample 1 (LS2). In addition, it can be seen that, in Sample 3-1 (LS2AG5K5) and Sample 3-2 (LS2Z5K5), the carbon dioxide capture capacity is higher than those in Sample 1-1 (LS2AG10) and Sample 2-1 (LS2Z10).

Figure 4B:
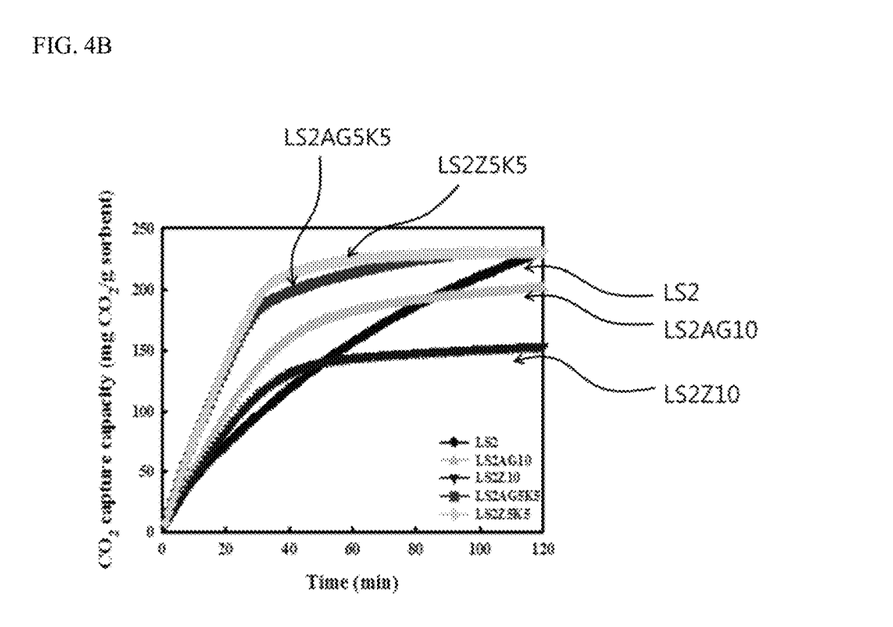
FIG. 4B is a graph showing carbon dioxide capture rates of Samples 3-1 and 3-2 according to an exemplary embodiment of the present invention.

Referring to FIG. 4B, it can be seen that carbon dioxide capture rates of Sample 3-1 (LS2AG5K5) and Sample 3-2 (LS2Z5K5) are higher than that of Comparative Sample 1 (LS2). It can also be seen that the carbon dioxide capture rates of Sample 3-1 (LS2AG5K5) and Sample 3-2 (LS2Z5K5) are higher than those of Sample 1-1 (LS2AG10) and Sample 2-1 (LS2Z10). That is, it can be seen that, when a mixed raw material further including alkali metal carbonate is used, carbon dioxide capture capacity is further improved.

XRD Analysis of Samples 3-1 and 3-2

Figure 4C:
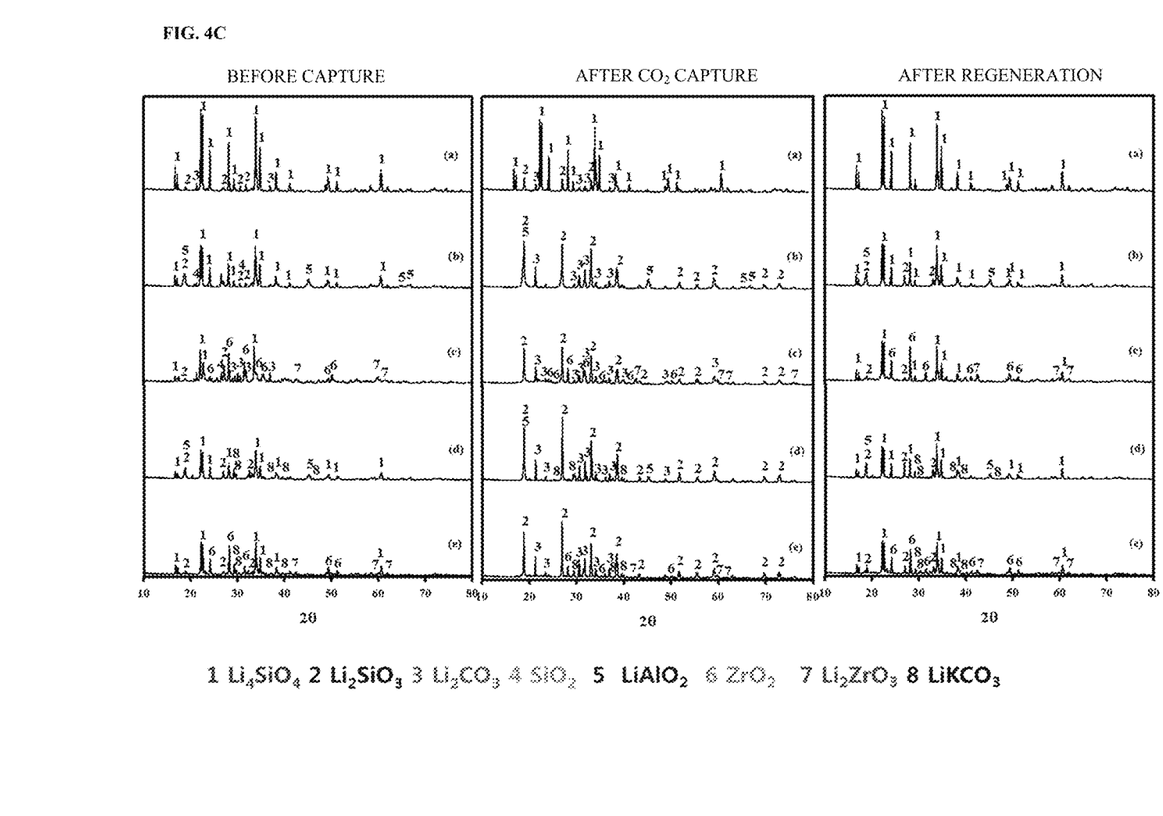
FIG. 4C is a diagram showing XRD analysis results for Samples 3-1 and 3-2 before and after carbon dioxide is captured and after carbon dioxide is regenerated according to an exemplary embodiment of the present invention.

XRD analysis was performed on Samples 1-1 to 3-2 and Comparative Sample 1 before and after carbon dioxide was captured and after carbon dioxide was regenerated, and the results are shown in FIG. 4C.

In FIG. 4C, (a) is a graph for Comparative Sample 1 (LS2), (b) and (c) are graphs for Sample 1-1 (LS2AG10) and Sample 2-1 (LS2Z10), respectively, and (d) and (e) are graphs for Sample 3-1 (LS2AG5K5) and Sample 3-2 (LS2Z5K5), respectively.

In addition, in FIG. 4C, ■ denotes $Li_4SiO_4$, ● denotes $Li_2SiO_3$, ◆ denotes $Li_2CO_3$, ▲ denotes $SiO_2$, and ▼ denotes $ZrO_2$, ▲ L denotes $LiAlO_2$, ∇ denotes $Li_2ZrO_3$, and □ denotes $LiKCO_3$.

Referring to FIG. 4C, it can be seen that, as shown in (d) and (e), Sample 3-1 (LS2AG5K5) and Sample 3-2 (LS2Z5K5) return to an original structure before capture and after regeneration of carbon dioxide, and thus exhibit a complete regeneration property. Contrarily, it can be seen that, in Comparative Sample 1 (LS2), regeneration in the same state as before capture does not occur. Meanwhile, it can be seen that, like (b) and (d), Sample 1-1 (LS2AG10) and Sample 2-1 (LS2Z10) also return to an original structure before capture and after regeneration of carbon dioxide, and thus exhibit a complete regeneration property.

Evaluation of Samples 3-1 and 3-2: Regeneration Property

Temperature programmed desorption (TPD) analysis was performed on each of Samples 3-1 and 3-2 by capturing carbon dioxide at 550° C. in the presence of water and raising a temperature by 1° C. per minute from 550 to 800° C. The results are shown in FIG. 4D.

Figure 4D:
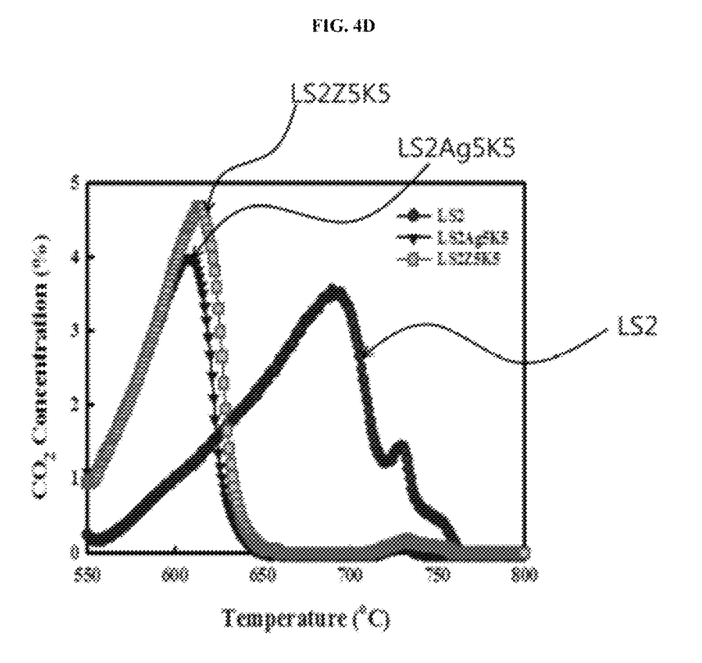
FIG. 4D is a diagram showing a result of evaluating regeneration properties of Samples 3-1 and 3-2 according to an exemplary embodiment of the present invention.

Referring to FIG. 4D, it can be seen that, in Sample 3-1 (LS2AG5K5) and Sample 3-2 (LS2Z5K5), most of carbon dioxide is emitted at a temperature of approximately 610 to 630° C. Contrarily, it can be seen that, in Comparative Sample 1 (LS2), carbon dioxide is emitted at a temperature of approximately 690 to 700° C. That is, it can be determined that, when the high-temperature dry sorbent of the present invention is used, carbon dioxide can be regenerated at a lower temperature than Comparative Sample 1.

Preparation of Samples 4-1 to 4-3

A sample prepared by mixing lithium carbonate and silicon oxide in a molar ratio of 2:1 was contained in an aluminum oxide crucible, dried in an atmospheric ambience using a heating furnace at 150° C. for 4 hours, heated again to 700° C., and baked for 5 hours, thereby preparing lithium silicate.

Subsequently, 10 wt % of lithium metasilicate was added to the prepared lithium silicate, based on a total weight of a sorbent, and mixed using a mortar for 30 minutes, thereby preparing Sample 4-1 (LS2ME10).

In addition, Sample 4-2 (LS2ME20) and Sample 4-3 (LS2ME30) were prepared by substantially the same process as used to prepare Sample 4-1, except that 20 and 30 wt % of lithium metasilicate were added based on the total weight of the sorbent.

Evaluation of Samples 4-1 to 4-3: Carbon Dioxide Capture Capacity

For each of Samples 4-1 to 4-3, a carbon dioxide capture capacity was measured by substantially the same method as used in the experiment for evaluating carbon dioxide capture capacity of Sample 1-1. The results are shown in Table 6.

TABLE 6

| Sortation | 1st cycle (mg $CO_2$/g sorbent) | 2nd cycle (mg $CO_2$/g sorbent) | 3rd cycle (mg $CO_2$/g sorbent) |
| --- | --- | --- | --- |
| Sample 4-1 (LS2ME10) | 179.2 | 180.1 | 181.0 |
| Sample 4-2 (LS2ME20) | 164.2 | 161.5 | 162.7 |
| Sample 4-3 (LS2ME30) | 130.7 | 128.6 | 127.9 |
| Comparative Sample 1 (LS2) | 227.1 | 166.6 | 103.5 |

Referring to Table 6, it can be seen that, in Comparative Sample 1 only formed of lithium silicate, the carbon dioxide capture capacity is degraded due to a continuous experiment, but in Samples 4-1 and 4-3, the carbon dioxide capture capacity is not degraded even by the continuous experiment. That is, it can be seen that the degradation in carbon dioxide capture capacity is prevented due to the lithium metasilicate.

According to a method of manufacturing a lithium silicate-based high-temperature dry sorbent for removing carbon dioxide and a high-temperature carbon dioxide dry sorbent of the preset invention, unlike the conventional two-step synthesis reaction including baking lithium carbonate and silica and performing additional plasticization by adding alkali carbonate and an aluminum compound, the high-temperature dry sorbent can be easily prepared through a one-step synthesis reaction. The high-temperature dry sorbent enables recovery and regeneration of carbon dioxide at a high temperature of 550 to 700° C., has almost no agglomeration in capture of carbon dioxide, maintains high capture capacity to carbon dioxide, and is regenerated and used at a lower temperature than the conventional sorbent.

While the present invention has been shown and described with reference to certain exemplary embodiments thereof, it will be understood by those skilled in the related art that various changes in form and details may be made therein without departing from the scope of the present invention as defined by the appended claims.

What is claimed is:

1. A method of manufacturing a lithium silicate-based high-temperature dry sorbent for removing carbon dioxide, comprising:
   forming a mixed raw material by mixing a lithium precursor, silicon oxide, and γ-aluminum oxide;
   obtaining a lithium silicate solid by drying the mixed raw material; and
   forming a high-temperature dry sorbent by baking the obtained lithium silicate solid,
   wherein the high-temperature dry sorbent includes lithium silicate ($Li_4SiO_4$) and lithium metasilicate ($Li_2SiO_3$).

2. The method according to claim 1, wherein the γ-aluminum oxide is included at 1 to 30 wt % with respect to a total weight of the mixed raw material.

3. The method according to claim 1, wherein the mixed raw material further includes an alkali metal carbonate.

4. The method according to claim 3, wherein the alkali metal carbonate is included at 1 to 10 wt % with respect to the total weight of the mixed raw material.

5. The method according to claim 3, wherein the alkali metal carbonate is included at 1 to 5 wt % with respect to the total weight of the mixed raw material.

6. The method according to claim 1, wherein the lithium precursor includes at least one selected from the group consisting of lithium carbonate, lithium hydroxide, lithium oxalate, lithium acetate and lithium nitrate.

7. The method according to claim 1, wherein the lithium precursor is lithium carbonate.

8. A high-temperature dry sorbent, comprising:
   lithium silicate ($Li_4SiO_4$); and
   lithium metasilicate ($Li_2SiO_3$),
   wherein the lithium metasilicate prevents agglomeration of the lithium silicate during the regeneration of the sorbent.

9. The high-temperature dry sorbent according to claim 8, further comprising:
   a lithium-oxometallic acid salt including at least one of lithium aluminate and lithium zirconate.

10. The high-temperature dry sorbent according to claim 8, further comprising:
    a lithium-carbonate represented as $LiMCO_3$ (wherein M is potassium (K) or sodium (Na)).

11. The high-temperature dry sorbent according to claim 8, which includes 3.6 to 5 mol of lithium (Li) with respect to 1 mol of silicon (Si) and 5 to 15 wt % of aluminum (Al) or zirconium (Zr) with respect to a total weight.

* * * * *